(12) United States Patent
Ansems et al.

(10) Patent No.: US 10,480,733 B2
(45) Date of Patent: Nov. 19, 2019

(54) FLAME SIMULATING LIGHT-EMITTING DEVICES AND RELATED METHODS

(71) Applicant: SIGNIFY HOLDING B.V., Eindhoven (NL)

(72) Inventors: Johannes Petrus Maria Ansems, Eindhoven (NL); Martinus Theodorus Bennebroek, Eindhoven (NL); Abraham Vamattathil Scaria, Eindhoven (NL); Ramon Antoine Wiro Clout, Eindhoven (NL); Dragan Sekulovski, Eindhoven (NL); Tim Dekker, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 63 days.

(21) Appl. No.: 15/515,590

(22) PCT Filed: Sep. 30, 2015

(86) PCT No.: PCT/IB2015/057480
§ 371 (c)(1),
(2) Date: Mar. 29, 2017

(87) PCT Pub. No.: WO2016/051352
PCT Pub. Date: Apr. 7, 2016

(65) Prior Publication Data
US 2018/0347771 A1  Dec. 6, 2018

Related U.S. Application Data

(60) Provisional application No. 62/058,138, filed on Oct. 1, 2014.

(51) Int. Cl.
*F21V 35/00* (2006.01)
*F21S 10/04* (2006.01)
(Continued)

(52) U.S. Cl.
CPC .............. *F21S 10/043* (2013.01); *F21K 9/61* (2016.08); *H05B 33/0842* (2013.01);
(Continued)

(58) Field of Classification Search
CPC .......... F21S 6/001; F21S 10/005; F21S 10/02; F21S 10/04
See application file for complete search history.

(56) References Cited

U.S. PATENT DOCUMENTS 2,005,196 A   6/1935   Mears
2,009,313 A   7/1935   Gietmann
(Continued)

FOREIGN PATENT DOCUMENTS

CN   1715738 A    1/2006
CN   202140866 U  2/2012
(Continued)

*Primary Examiner* — Thuy V Tran
(74) *Attorney, Agent, or Firm* — Akarsh P. Belagodu (57) ABSTRACT

Lighting systems, devices, methods and apparatus for simulating a candle flame are disclosed. The systems and methods employ spatially distributed, disjointed sets of light-emitting elements that are independently controlled with randomized control signals to simulate a candle flame by forming spatially and temporally varying lighting effects. Further, the disjointed sets are controlled such that the total light intensity is essentially maintained. In addition, systems and methods employ a transition probability model to adjust intensities of light-emitting elements in a way that accurately mimics a candle flame.

19 Claims, 5 Drawing Sheets

(51) Int. Cl.
*H05B 33/08* (2006.01)
*F21K 9/61* (2016.01)
*F21S 10/02* (2006.01)
*F21S 6/00* (2006.01)
*F21S 10/00* (2006.01)
*F21Y 115/10* (2016.01)

(52) U.S. Cl.
CPC .......... *H05B 33/0854* (2013.01); *F21S 6/001* (2013.01); *F21S 10/005* (2013.01); *F21S 10/02* (2013.01); *F21S 10/04* (2013.01); *F21Y 2115/10* (2016.08)

(56) References Cited

U.S. PATENT DOCUMENTS

| | | | |
|---|---|---|---|
| 5,924,784 A | 7/1999 | Chliwnyj et al. | |
| 9,644,807 B1* | 5/2017 | Harris | F21S 10/04 |
| 2003/0072154 A1* | 4/2003 | Moore | F21S 10/04 |
| | | | 362/234 |
| 2004/0223326 A1* | 11/2004 | Wainwright | F21S 6/001 |
| | | | 362/231 |
| 2005/0196716 A1* | 9/2005 | Haab | F21S 6/001 |
| | | | 431/126 |
| 2008/0112154 A1* | 5/2008 | Reichow | F21S 10/04 |
| | | | 362/96 |
| 2009/0080871 A1 | 3/2009 | Chin | |
| 2009/0313866 A1 | 12/2009 | Wang | |
| 2012/0147621 A1 | 6/2012 | Holten et al. | |
| 2012/0147624 A1 | 6/2012 | Li et al. | |
| 2012/0201020 A1* | 8/2012 | Gutstein | F21S 6/001 |
| | | | 362/184 |
| 2013/0083555 A1 | 4/2013 | Chen et al. | |
| 2014/0254148 A1* | 9/2014 | Fournier | F21L 4/00 |
| | | | 362/235 |

FOREIGN PATENT DOCUMENTS

| | | |
|---|---|---|
| CN | 102367943 A | 3/2012 |
| CN | 102918668 A | 2/2013 |
| CN | 102966917 A | 3/2013 |
| CN | 202760259 U | 3/2013 |
| CN | 103017026 A | 4/2013 |
| CN | 103460810 A | 12/2013 |
| JP | 3148965 A2 | 6/1991 |
| JP | 8180977 A2 | 7/1996 |
| JP | 2010003581 A2 | 1/2010 |

\* cited by examiner

FLAME SIMULATING LIGHT-EMITTING DEVICES AND RELATED METHODS

CROSS-REFERENCE TO PRIOR APPLICATIONS

This application is the U.S. National Phase application under 35 U.S.C. § 371 of International Application No. PCT/EP2015/057480, filed on Sep. 20, 2015, which claims the benefit of U.S. Patent Application No. 62/058,138, filed on Oct. 1, 2014. These applications are hereby incorporated by reference herein.

TECHNICAL FIELD

The present invention is directed generally to light-emitting devices. More particularly, various inventive methods, devices and apparatus disclosed herein relate to creating a candle flame flickering effect with light-emitting devices.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate, for example, as discussed in detail in U.S. Pat. Nos. 6,016,038 and 6,211,626, incorporated herein by reference, a variety of colors and color-changing lighting effects.

One aesthetic lighting effect that can be recreated to varying degrees with LEDs is a candle lighting effect. Known LED lamps that attempt to accurately mimic a candle flame have been used for low-level background illumination. However, employing these types of LED devices for primary illumination, such as in, for example, a large chandelier, is relatively difficult, as the aggregate effect of such LED devices can appear as a fluctuation in total flux as opposed to a candle-like flickering. In addition, devices that rely on light-guide designs to mimic a candle flame tend to provide a sparkling effect rather than a flickering that one would expect from a candle flame.

Thus, there is a need in the art for an improved light-emitting device that provides a more accurate candle flickering effect that can maintain a total flux level for primary illumination purposes.

SUMMARY

The present disclosure is directed to inventive methods, devices and apparatus for simulating a candle flame. For example, the flickering of a candle can be simulated in a lighting system by randomizing the light output using a plurality of disjointed sets of LEDs. In particular, each of the disjointed sets can be controlled independently using a randomized or repetitive process. Here, the lighting elements of the disjointed sets can be dispersed amongst each other to create a spatially varying lighting effect, in addition to a temporally varying lighting effect, through the use of a control algorithm that leverages the randomized or repetitive process along with geometric positioning of the lighting elements in each set to optimize the flickering effect. In accordance with one advantageous aspect, the use of the disjointed sets with independently generated control signals can ensure that the total flux of the system is maintained. This feature is especially desirable if the lighting system is employed for primary lighting purposes, as in, for example, a chandelier.

Generally, in one aspect, a light-emitting system for simulating a flame includes a plurality of disjointed sets of light-emitting elements. The light-emitting elements of a given set of the disjointed sets of light-emitting elements are configured to adjust corresponding intensities of emitted light in accordance with a respective control signal. In addition, at least one parameter of the respective control signal is an independent variable with respect to that parameter of another control signal with which the light-emitting elements of another set of the disjointed sets adjust respective emitted light intensities. Grouping the light-emitting elements into disjointed sets and controlling the light-emitting elements with independent control signals provides a realistic flickering lighting effect and permits the system to maintain a total flux level.

In accordance with one embodiment, the light-emitting elements within the given set adjust the corresponding intensities of the emitted light in accordance with a plurality of light-emission signals that are based on the respective control signal such that the parameter(s) of each light-emission signal of the plurality of light-emission signals is a dependent variable with respect to the same parameter(s) of each other light-emission signal of the plurality of light-emission signals. The dependence between the parameters for light-emitting elements within a given set enables the system to maintain a total flux level for the system, thereby ensuring that the flickering does not form a disconcerting lighting effect. This feature is beneficial if the system is employed for primary lighting purposes.

In one embodiment, the corresponding intensity of each of the light-emitting elements of the given set is adjusted with a phase of the respective control signal that is different from a phase of the respective control signal with which the corresponding intensity of at least one other light-emitting element of the given set is adjusted. Using different phases in this way provides an excellent means for maintaining the total flux level. Thus, in this particular embodiment, each of the phases are configured such that a total intensity of light emitted by the given set is essentially constant. "Essentially constant" should be understood to mean that the intensity varies within a range of +/−15% of a median intensity emitted by the set. More preferably, the intensity can vary within a range of +/−10% of a median intensity emitted by the set and, even more preferably, the intensity can vary within a range of +/−5% of a median intensity emitted by the set. Most preferably, the intensity can vary within a range of +/−1% of a median intensity emitted by the set.

In accordance with an exemplary embodiment, the light-emitting system further includes a controller configured to dynamically generate each of the control signals by adjusting the parameter(s) of a base signal. In one version of this embodiment, the controller is configured to generate each of the control signals by employing a randomized process to determine a sequence of values of the parameter(s). Utilizing this type of process enables the lighting effect to be randomized, thereby better simulating a flame. In accordance with one optional feature, the system further includes a sensor configured to obtain a measure of at least one environmental state. Here, the controller is configured to dynamically generate each of the control signals by further adjusting the parameter(s) of the base signal in accordance with the measure of the environmental state(s). Thus, in this way for example, the lighting system can react to environmental elements, such as, for example, airflow, temperature and/or motion, which further enhances the flickering effect, making it more realistic.

In one exemplary embodiment, the light-emitting elements of the disjointed sets are spatially distributed such that at least one light-emitting element from each of the disjointed sets other than the given set is disposed between at least two light-emitting elements of the given set. This spatial distribution and interspersion of the lighting elements of the disjointed sets further randomizes and improves the flickering effect.

In accordance with an exemplary embodiment, the system can further comprise a light-guide structure including a plurality of light-guides, where each of the light-guides out-couples light from a different one of the disjointed sets of light-emitting elements. In one version of the embodiment, the plurality of light-guides are nested in the light-guide structure. The nested light-guide feature enables a vertical variance of the lighting effect, in addition to a horizontal variance, to better simulate the candle flickering. The system can include another optional feature in which each set of the disjointed sets emits light with a color that is different from a color of light emitted by any other set of the disjointed sets. Dedicating a different color to each of the nested light-guides in this way enables a realistic simulation of a color variance of a candle flame. Preferably, the color ranges from a warm white to a cool white to accurately mimic the flame.

Another aspect is directed to a method for simulating a flame with a light-emitting system. In the method, a plurality of control signals is respectively generated for a plurality of disjointed sets of light-emitting elements. Further, in each set of the plurality of disjointed sets, intensities of the light-emitting elements of the set are adjusted in accordance with a respective control signal of the plurality of control signals, where at least one parameter of the respective control signal for any of the sets is an independent variable with respect to the parameter(s) of the respective control signal for any other set of the disjointed sets. The parameter(s) of the signal can be a period, an amplitude and/or a direct current offset. As noted above, grouping the light-emitting elements into disjointed sets and adjusting intensities of the light-emitting elements with independent control signals provides a realistic flickering lighting effect and permits the system to maintain a total flux level.

In one exemplary embodiment, a respective light-emission signal that is based on the respective control signal for the corresponding set is generated, for each of the light-emitting elements in each corresponding set of the plurality of disjointed sets, such that the parameter(s) of each light-emission signal for the corresponding set is a dependent variable with respect to the parameter(s) of each other light-emission signal for the corresponding set. In addition, the method further comprises adjusting the intensity of each respective light-emitting element of the corresponding set in accordance with the light-emission signal for the respective light-emitting element. As discussed above, the dependence between the parameters for light-emitting elements within a given set enables the system to maintain a total flux level.

In accordance with an exemplary embodiment, the method comprises applying, in each corresponding set of the plurality of disjointed sets, a plurality of phases of the respective control signal to the light-emitting elements of the corresponding set such that the phase applied to any light-emitting element of the set is different from the phase applied to any other light-emitting element of the corresponding set. As noted above, the different phases can be configured such that a total intensity of light emitted by the set is essentially constant.

In one embodiment, each of the control signals can be generated by modulating the parameter(s) of a base signal. The parameter(s) of the signal can be a period, an amplitude and/or a direct current offset. In one version of the embodiment, each of the control signals can be generated by determining a sequence of values of the parameter(s). Here, the sequence of values is computed by determining a sequence of states in accordance with a randomized process. As discussed above, randomizing the lighting effect in this way provides an improved and more accurate candle flame simulation. Optionally, each of the control signals is generated by sensing a measure of at least one environmental state and, for each control signal, further adjusting the parameter(s) of the base signal in accordance with the measure of the environmental state(s). As discussed above, the lighting effect can be adapted to environmental elements, such as, for example, airflow, temperature and/or motion, to further enhance the realism of the flickering effect. The adaptation can be performed in a variety of ways. For example, filter parameters of a low-pass filter with which the sequence of values is filtered can be adjusted in accordance with the measure. Alternatively, where, for example, the randomized process is a Markov process, at least one probability of a state transition probability matrix employed in the Markov process can be adjusted in accordance with the measure.

According to one exemplary aspect of the present invention, the light-emitting system can include at least one light-emitting element and a controller. Here, the light-emitting element(s) is configured to adjust a corresponding intensity of emitted light in accordance with a control signal. The controller is configured to generate the control signal by adjusting at least one parameter of a base signal and to perform the adjustment by applying a transition probability model. In the model, a first probability that the light-emitting element(s) remains in a state of a first set of states is different from a second probability that the light-emitting element(s) remains in a state of a second set of states, where a first value of the parameter(s) of the first set of states is different from a second value of the parameter(s) of the second set of states. This configuration of the transition probability model can enable the system to control and alter the light intensities of the system in a way that accurately depicts the flickering of a flame. Preferably, in one embodiment, the first probability is greater than the second probability and the parameter includes a period of the base signal, where the second value is less than the first value. These features provide long, relatively steady states and brief states of significant movement of the simulated flame, which is a more accurate simulation of candle flame flickering. Preferably, in an embodiment, the controller is configured to perform the adjustment in accordance with a Markov process, where the transition probability model is a transition probability matrix.

It should be noted that the methods described above can be implemented in a computer readable program that is stored on a computer readable medium and can be implemented by a computer that executes the instructions of the program in accordance with the method.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The terms "light source" and "light-emitting element" should be understood to include any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light-emitting element may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient luminous flux in the visible spectrum generated in the space or environment (the unit "lumen" often is employed to represent the total light output from a light source in all directions, in terms of "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer" quality, while higher color temperatures generally indicate white light having a more significant blue component or a "cooler" quality. By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be understood that a first parameter is "an independent variable with respect to," as the phrase is defined herein, a second parameter when changing the value of the first parameter does not change the value of the second parameter, and vice versa. In addition, it should also be understood that a first parameter is "a dependent variable with respect to," as the phrase is defined herein, a second parameter when changing the value of the first parameter changes the value of the second parameter, and vice versa.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Current LED systems that attempt to simulate a candle flame generally do not provide an accurate flickering effect, as they lack a sufficient degree of both spatial and temporal variations. Applicants have recognized and appreciated that it would be beneficial to employ disjointed sets of light-emitting elements with independent control signals for each of the sets to better mimic flickering of a flame and to maintain, if desired, a total flux for primary illumination.

In view of the foregoing, various embodiments and implementations of the present invention are directed to flame-simulating light-emitting systems, methods, apparatus and devices. Preferred embodiments include several methods and systems that mimic the natural flame behavior of traditional candles and torches in LED-based products used for decorative indoor and outdoor illumination. The embodiments can control multiple LEDs individually or in groups and can use a control algorithm that optimizes the LED control for selected geometric LED arrangements and, preferably, maintains the total flux level. To properly simulate a natural flame behavior, the LEDs can be controlled such that the overall 3D illumination behavior (in x, y, and z directions) simulates a flame. To further mimic the natural flame behavior, a flow sensor can be utilized to dynamically adapt the simulated flame to the direction and/or changes of local airflow. In addition to simulating candle flame shapes, colored LEDs, such as, for example, off-white and red LEDs, can be employed to mimic flame color changes as well.

Figure 1:
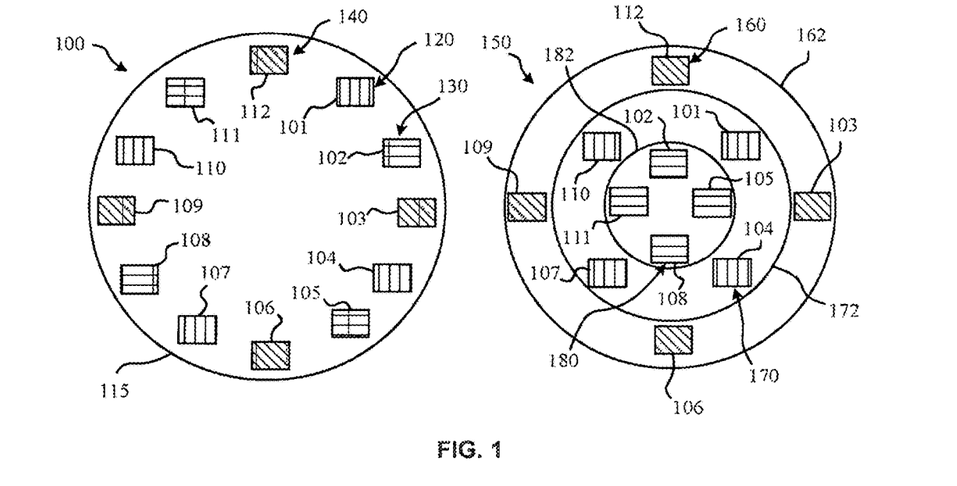
FIG. 1 illustrates diagrams of top views of exemplary arrangements of light-emitting elements in accordance with exemplary embodiments of the present invention.

Referring to FIG. 1, top views of exemplary arrangements 100 and 150 of light-emitting elements are illustratively depicted. The light-emitting elements in FIG. 1 are preferably LEDs, but can be any of a variety of light sources, as discussed above. Arrangement 100 includes three disjointed sets 120, 130, 140 of light emitting elements. In particular, set 120 is denoted by vertical-line shading and includes light-emitting elements 101, 104, 107 and 110, while set 130 is denoted by horizontal-line shading and includes light-emitting elements 102, 105, 108 and 111. In turn, set 140 is denoted by angled-line shading and includes light-emitting elements 103, 106, 109 and 112. The arrangement 100 can be disposed in a light-guide 115, which generally denotes one of various light-guides that can be employed, as discussed in more detail herein below. The light emitting elements 101-112, in either arrangement 100 or 150, can be positioned on a two-dimensional board with their output coupled into the light guide structure for the arrangement, or alternatively in a 3D geometry with or without the light guide. As illustrated by arrangement 100, the light-emitting elements of the disjointed sets 120, 130 and 140 are spatially distributed such that, for any given set, at least one light-emitting element from each of the other disjointed sets is disposed between at least two light-emitting elements of the given set. For example, in arrangement 100, light-emitting elements 101 and 102 from sets 120 and 130, respectively, are disposed between light-emitting elements 112 and 103 of set 140. Preferably, the lighting elements of the disjointed sets are maximally interspersed, as illustrated in arrangement 100, to optimally randomize the combined lighting effect from the sets 120, 130 and 140 and accurately mimic a candle flame. As discussed in more detail herein below, each of the sets 120, 130 and 140 can be controlled with respective, independent control signals to realistically simulate the flickering of a flame, while leveraging the geometric positioning of the LEDs of the disjointed sets.

Figure 2:
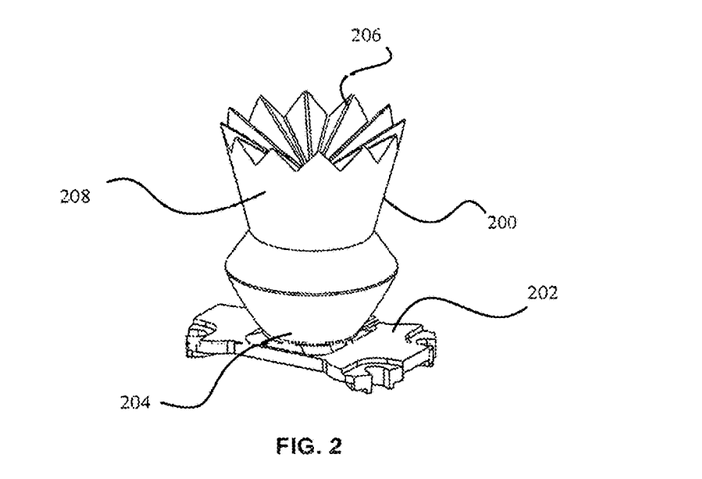
FIG. 2 illustrates a diagram of one exemplary light-guide structure that can be employed with various arrangements of light-emitting elements in accordance with exemplary embodiments of the present invention.
Figure 3A:
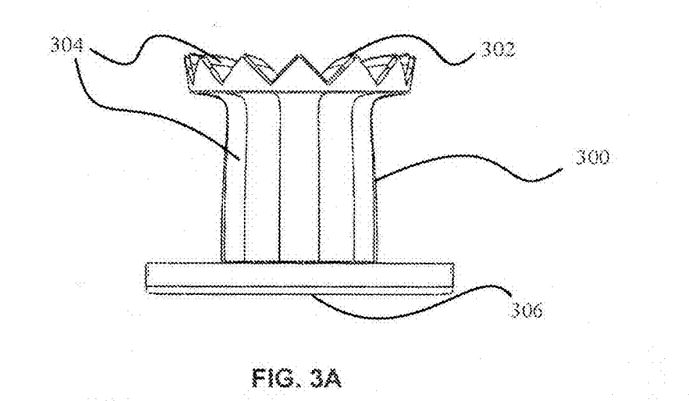
FIGS. 3A-C illustrate diagrams of an alternative light-guide structure that can be employed with various arrangements of light-emitting elements in accordance with exemplary embodiments of the present invention.
Figure 3B:
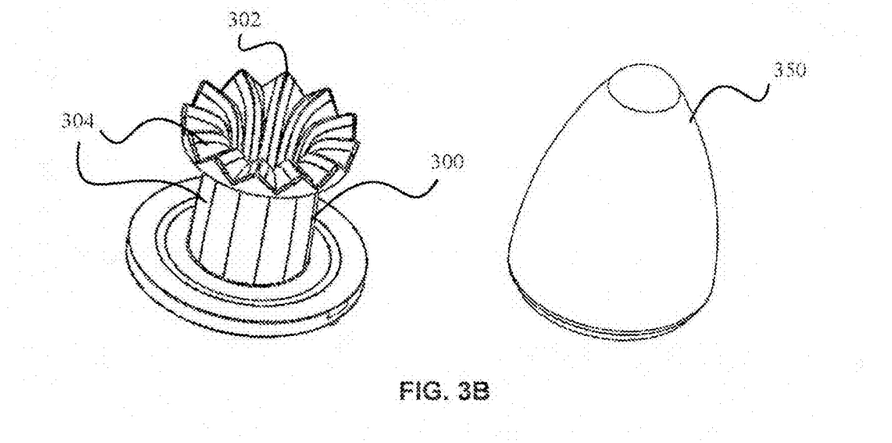
Figure 3C:
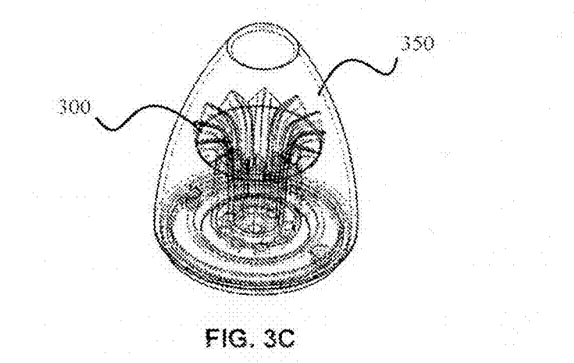

To enhance the spatial variance of light, as noted above, the arrangement 100 can be disposed within a light-guide 115. FIG. 2 illustrates one exemplary light-guide 200 that can be implemented as the light-guide 115. Here, the arrangement 100 can be positioned in area 204 within the light-guide 200 and can be coupled to a two-dimensional board 202 for power and emission control. The top portion of the light-guide 200 can include angled ridges 206 at the top of respective optical channels within the light-guide 200. The light-guide 200 can further include face(s) 208 through which light is out-coupled in various directions to provide a flickering effect when the intensities of the light-emitting elements of the arrangement 100 are controlled in accordance with the randomized or repetitive processes described herein below. FIGS. 3A, 3B and 3C illustrate an alternative light-guide 300 that can be implemented as the light-guide 115. In this embodiment, and any other embodiment described herein, the system can be enclosed by a transparent cover 350, as illustrated in FIG. 3C. The light-guide 300 includes curved ridges 302 at the top of optical channels within the light guide, and faces 304 through which light can be out-coupled in various directions to simulate a flickering effect, as noted above. In the particular example illustrated in FIGS. 3A, 3B and 3C, the light-guide 300 preferably accommodates nine light-emitting elements in area 306, which can be disposed on a two-dimensional circuit board as discussed above. Here, the light-emitting elements can be divided into three disjointed sets of three light-emitting elements, which are maximally distributed, as in the distribution of light-emitting elements in arrangement 100 of FIG. 1. However, it should be understood that the principles described herein can be applied to any number of light-emitting elements and any number of disjointed sets of light-emitting elements.

In the light-guides illustrated in FIGS. 2 and 3A-C, most of the light leaves the light-guides through the faces 208 and 304. To more accurately mimic a flame, vertical flicker can also be simulated by the lamp system. This can be implemented by forming some, preferably non-rotational symmetric, vertically arranged out-coupling structures along the side surfaces of the light guides. Preferably, these structures can be designed such that they each only couple out light from one or two light-emitting elements, as illustrated by the structure depicted in FIGS. 3A-C.

Figure 4A:
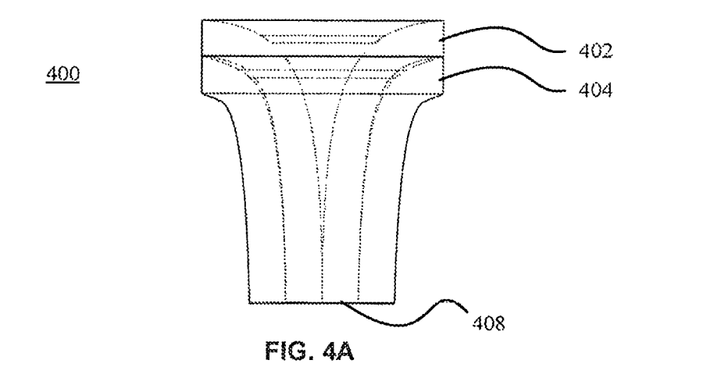
FIGS. 4A-B illustrate a diagrams of a light-guide structure that includes nested light-guides that can be employed to provide vertical flickering variation in accordance with exemplary embodiments of the present invention.
Figure 4B:
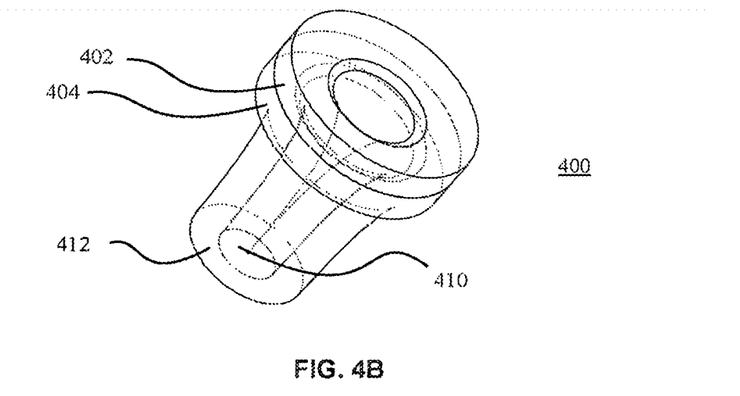

Alternatively or additionally, the light-guide can be divided into separate vertical portions that couple light of distinct sets of light-emitting elements out at different heights. FIGS. 4A and 4B illustrate an example 400 of such a light-guide structure. Here, the light-guide structure 400 is composed of nested light-guides 402 and 404, where the disjointed sets of light-emitting elements of an arrangement can be disposed within area 408 of the light-guide structure 400. Similar to the above-described embodiments, the arrangement can be disposed on a two-dimensional circuit board for powering and control purposes. These light-guides can also be made with comparable 'filament' looking structures.

Arrangement 150 illustrated in FIG. 1, which includes disjointed sets 160, 170 and 180, can be employed within a nested light-guide structure. In particular, arrangement 150 is preferably employed with a light-guide structure that includes three nested light-guides. Set 160 is denoted by angled-line shading and includes light-emitting elements 103, 106, 109 and 112, while set 170 is denoted by vertical-line shading and includes light-emitting elements 101, 104, 107 and 110. In addition, set 180 is denoted by horizontal-line shading and includes light-emitting elements 102, 105, 108 and 111. As illustrated in arrangement 150, the light-emitting elements of set 160 are disposed in light-guide 162, the light-emitting elements of set 170 are disposed in the light guide 172 and the light-emitting elements of set 180 are disposed within light guide 182. Here, for simplicity of illustration, the light-guide structure 400 includes two nested light-guides. In accordance with one exemplary embodiment, where only sets 180 and 170 are employed in the lighting system, the light-guides 402 and 404 of the light-guide structure 400 are implemented as the light guides 182 and 172, respectively, where set 180 is disposed in area 410 and set 170 is disposed in area 412. Thus, here, light emitted from centrally positioned light-emitting elements, such as, for example, set 180, and light emitted from outwardly positioned light-emitting elements, such as, for example set 170, will be seen as light emanating from different heights through light-guides 402 and 404, respectively. Where the light-guide structure includes three nested light-guides, an additional outer light-guide can be employed as outer light-guide 162, in which light-guides 172 and 182 can be nested in a manner similar to the nested light-guides illustrated in FIG. 4. In this example, outer light-guide 162 will be perceived as being emitted from a higher height than light emitted from light-guides 172 and 182.

In addition to creating a vertically varying flickering effect, vertically separated light-guide structures can also be used to simulate a color variation of a candle flame. For example, sets of the arrangement 150 can be employed with the light-guide structure 400 or a similar structure, as discussed above. However, here, each of the disjointed sets 160, 170 and 180 emit light of different colors. Preferably, the light emitted by the set 180 is a relatively warm white light, the light emitted by the set 170 is a relatively cooler white light that is cooler than the light emitted by set 180, and the light emitted by the set 160 is a relatively cool white light that is cooler than the light emitted by the set 170. Thus, the colors of light emitted by the plurality of disjointed sets 160, 170 and 180 can range from a warm white to a cool white. As such, when controlled in accordance with the control signals described in more detail below, the arrangement 150 can provide a three-dimensional flickering effect as well as a color variation that simulates a candle flame.

In accordance with an alternative or additional exemplary aspect of the present invention, the light-guide structure can be divided into separate radial parts, where the light-guides are radially in the same plane as the light-emitting elements, as illustrated by light-guides 402 and 404 in FIGS. 4A-B. Here, the radial parts or light-guides couple light of distinct light-emitting elements out in different, respective segments. Alternatively or additionally, the light-guide structure can include facets through which light from the light-emitting elements is coupled out. Further, the light-guide structure can include an out-coupling structure, formed, for example, by means of laser or paint, that enhances the contrast of the dynamic effect of light transmitted out of the structure.

Figure 7:
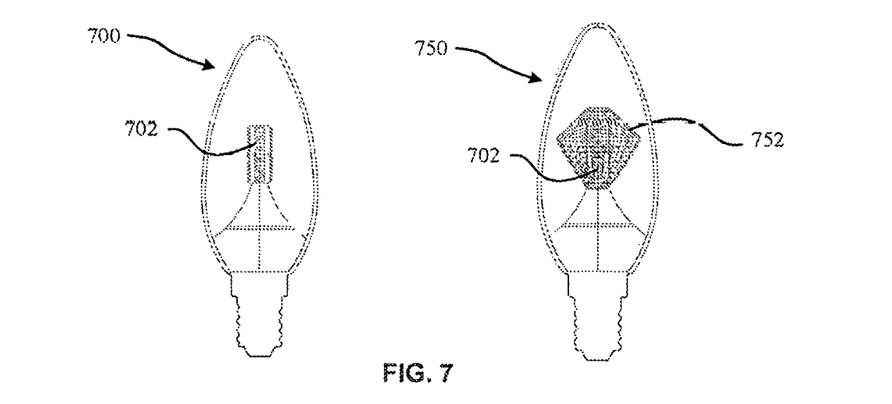
FIG. 7 illustrates diagrams of light-emitting systems that employ three-dimensional positioning with vertically arranged light-emitting elements in accordance with exemplary embodiments of the present invention.

Alternatively or additionally, a vertical flame flickering effect can be enhanced with three-dimensional positioning of naked, vertically arranged light-emitting elements, with or without some 'hiding' optics. FIG. 7 illustrates an example of a light-emitting system 700 that includes such vertically arranged light-emitting elements 702 and an example of a light-emitting system 750 that employs hiding optics 752 with such vertically arranged light-emitting elements 702. The light-emitting elements in either or both of the systems 700 and 750 can be controlled individually or in groups. In addition, the structure can include a transparent heat sink.

Figure 5:
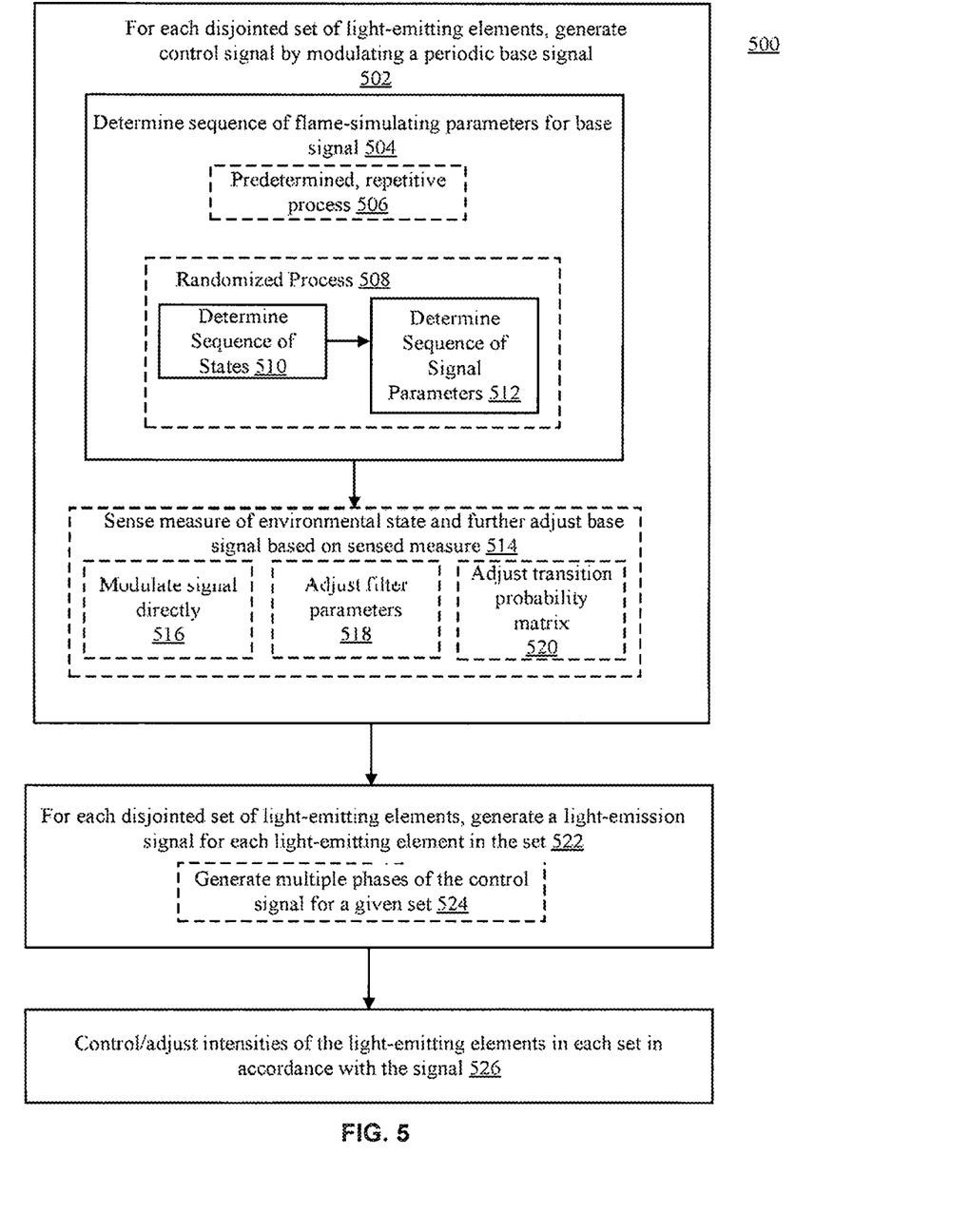
FIG. 5 illustrates a block/flow diagram of a method for simulating a candle flame in accordance with exemplary embodiments of the present invention.

Referring now to FIG. 5, an exemplary block/flow diagram of a method 500 for simulating a flame with a light-emitting system in accordance with various preferred embodiments of the present invention is illustratively depicted. It should be understood that the method 500 can be applied to any of the light-emitting systems described above, including the systems incorporating arrangements 100 and/or 150. In accordance with the method 500, the intensity of light-emitting elements can be controlled individually or in groups to simulate any one or more following effects: movement of a simulated flame inside a lamp, sparkle, and/or dynamic spatial color distribution of a flame.

Figure 6:
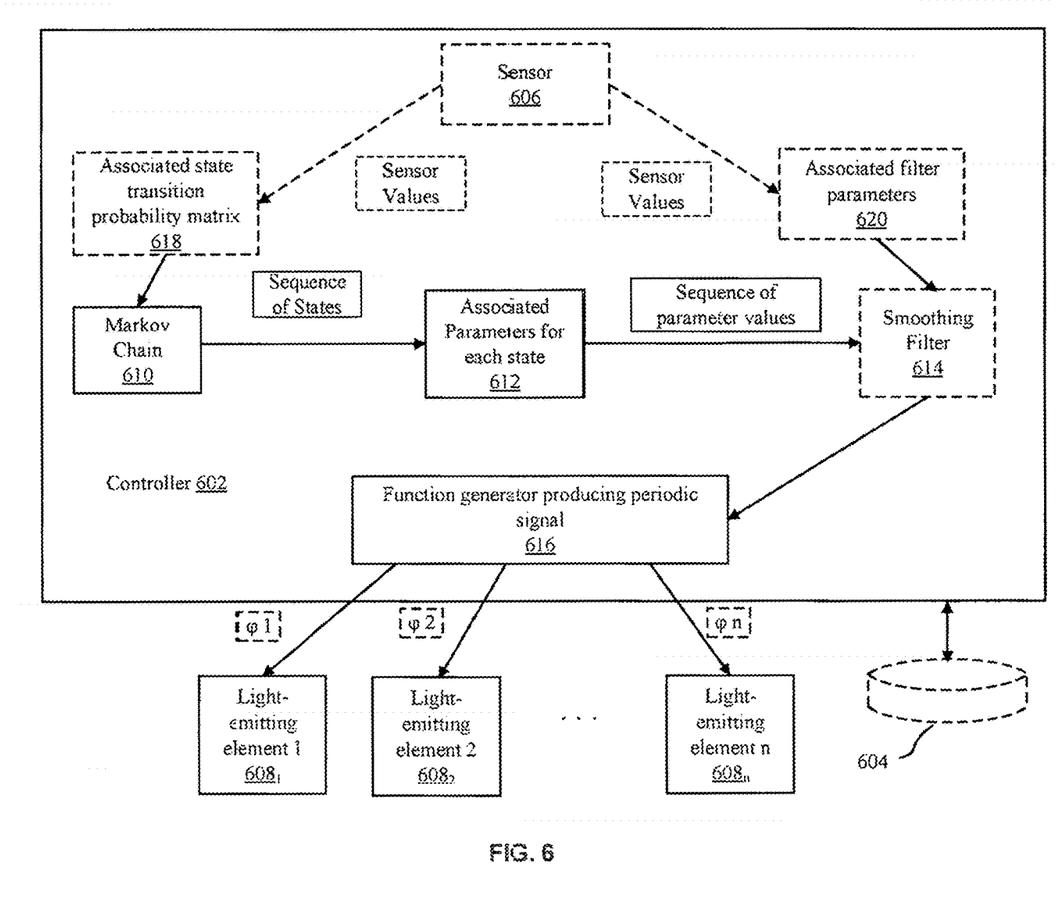
FIG. 6 illustrates a block/flow diagram of a system for simulating a candle flame in accordance with exemplary embodiments of the present invention.

For illustrative purposes, reference is also made to FIG. 6, which provides a block diagram of an exemplary system 600 that can be configured to perform the method 500. The system 600 includes a controller or control module 602 and light-emitting elements $608_1$-$608_n$. Here, the light-emitting elements $608_1$-$608_n$ can be the light-emitting elements of any set 120, 130 or 140 of the arrangement 100, any set 160, 170 or 180 of the arrangement 150, or a set of any other suitable arrangement. For example, the light-emitting elements $608_1$-$608_n$ can be the light-emitting elements 101, 104, 107 and 110 of the set 120, where n=4. It should be noted that only one disjointed set of light-emitting elements is depicted in FIG. 6 to maintain clarity of the illustration. However, it should be understood that each disjointed set in a given arrangement operates similarly with the respective control signal for the set. The control module or controller 602 can be a microcontroller that is configured to run a computer-readable program to perform the method 500. The program can be stored on an optional computer-readable storage medium 604, which can provide memory for the controller 602 to implement a set of instructions of the method 500 stored thereon. Alternatively, the controller can be implemented with dedicated hardware, such as a programmable logic circuit, as indicated above.

It should be noted that, although the method 500 is described herein below as being performed for multiple sets of light-emitting elements, the method 500 can be performed by the system 600 for only a single set, where reference to each set of light-emitting elements would apply to only one set. In addition, in one or more exemplary embodiments, a given set can consist of only one light-emitting element, two light-emitting elements, three light-emitting elements, five-light-emitting elements, or any other suitable number of light-emitting elements.

The method 500 can begin at step 502, at which the controller 602 can, for each disjointed set of a plurality of disjointed sets of light-emitting elements, generate a control signal by modulating a periodic base signal. For example, for the arrangement 100 of FIG. 1, the controller 602 can generate one control signal for set 120, another control signal for set 130 and yet another control signal for set 140. The periodic base signal can be a sinusoidal signal. The controller 602 can dynamically generate a plurality of control signals respectively for a plurality of disjointed sets of light-emitting elements in a variety of ways. In one preferred embodiment, the controller 602 can be configured to dynamically generate each of the control signals by adjusting/modulating at least one parameter of the base signal. Here, the parameter(s) can be, for example, a period, an amplitude and/or a direct current offset of the signal(s). Preferably, the period of the signal is modulated to form a flame flickering lighting effect.

For example, to implement step 502, the controller 602, at step 504, can determine a sequence of flame-simulating parameters for the base signal. In particular, the controller 602 can determine a sequence of the period, amplitude and/or direct current offset of the base signal. For example, in one embodiment, step 504 can be implemented in accordance with block 506 in which a pre-determined repetitive process is performed. For example, the sequence of parameters can be a list of pre-determined parameters that is output in a repetitive loop through the list.

Alternatively and preferably, step 504 can be performed in accordance with block 508, in which a randomized process is implemented to determine a sequence of values of the parameter(s). Here, to implement block 508, at step 510, the controller 602 can determine a sequence of states in accordance with a randomized process. In a preferred embodiment, the randomized process is a Markov chain or process. A Markov process is a stochastic process X defined by a sequence of random variables $X=\{X_t\}_{t \geq 1}=\{X_1, X_2, \ldots\}$ where the value of $X_t$ at any time t is dependent only on the immediately preceding value of the variable, $X_{t-1}$. Here, $X_t$ can denote the parameter of the base signal. The variable $X_t$ can take any value of a discrete set $\varepsilon$ of states, where the behavior of the Markov process is defined by a transition probability matrix $A=(p_{ij})$ of conditional probabilities $p_{ij}$.

The elements $p_{ij}$ of the transition probability matrix provide the probability that the process will be in a state j at a time t+1, given that the process was in state i at time t, $p_{ij}=\{X_{t+1}=j|X_t=i\}$. One preferred example of the state transition probability matrix $A=(p_{ij})$ is provided in Table 1, below, while a preferred example of the set of states $\varepsilon$ of the modulated parameter of the signal, which in this case is the period, is provided in Table 2, below.

TABLE 1

Example of State Transition Probability Matrix $$A = \begin{bmatrix} 0.965 & 0.01 & 0.01 & 0.01 & 0.005 \\ 0.01 & 0.965 & 0.01 & 0.01 & 0.005 \\ 0.01 & 0.01 & 0.965 & 0.01 & 0.005 \\ 0.01 & 0.01 & 0.01 & 0.965 & 0.005 \\ 0.03 & 0.03 & 0.03 & 0.03 & 0.88 \end{bmatrix}$$

TABLE 2

Associated Period Length per State

| State | Period Length in Seconds |
|---|---|
| 1 | 2 s |
| 2 | 1 s |
| 3 | 0.66 s |
| 4 | 0.5 s |
| 5 | 0.2 s |

Preferably, the transition probability matrix is constructed so that at least two sets of states have a different average probability of staying in a current state. For example, in Tables 1 and 2, the states can be delineated as two sets of states, where the first set is composed of states 1-4 and the second set is composed of state 5. Here, the probability that the system will remain in a state of the first set is on average substantially higher than the probability that the system will remain in a state of the second set. Further, the values of the states is also preferably different between the two sets of states. For example, where the control parameter is the period of the signal, the periods in the second set are less than the periods in the first set. For example, in Table 2, the average period of the first set is about one second, while the average period of the second set is less than that of the first set, at 0.2 seconds. The preferred configuration of the transition probability matrix and the values of the control parameter(s) provide a fluctuation of the intensities of light-emitting elements that accurately simulates the flickering of a flame.

As such, in general, the controller 602 can apply a transition probability model in which a first probability that one or more light-emitting elements of a given set of light-emitting elements remains in a state of a first set of states is greater than a second probability that the light-emitting element(s) remains in a state of a second set of states. Here, a first value of one or more control parameters of the first set of states is different from a second value of the one or more parameter(s) of the second set of states. As indicated above, the transition probability model is preferably a transition probability matrix of a Markov process or model and the one or more control parameters preferably includes a period of the base signal, where the first probability is greater than the second probability and where the second value is less than the first value.

It should be noted that the discussion of the control parameter with regard to the period can equivalently be applied to the frequency. Here, the period (T) is related to the frequency (f) as T=1/f, and the above-described relationships with respect to the two sets of states can be modified in accordance with this inverse relation between the period and frequency. Thus, use of the frequency as the control parameter is equivalent to the use of the period as the control parameter in accordance with the aspects described herein.

Accordingly, at step 510, the controller 602 can employ a Markov chain 610 in accordance with the state transition probability matrix A, such as, for example, the matrix illustrated in Table 1, to provide a sequence of states to a parameter module 612. At step 512, the module 612 of the controller 602 can determine the associated parameters for each received state by mapping the state to the associated parameter. For example, the mapping can be performed in accordance with Table 2, where the parameter is the period of the signal. The parameter module 612 may then provide the sequence of parameter values to the function generator 616 of the controller 602. Optionally, the controller 602 can include a smoothing filter 614, which can be, for example, a low pass filter. Here, the parameter module 612 can provide the sequence of the parameter values to the smoothing filter 614, which applies smoothing filter parameters to the parameter values received from the module 612, and provides the resultant, filtered parameters to the function generator 616. Thereafter, continuing at step 502, the function generator 616 can generate the control signal by modulating a base, periodic signal, such as, for example, a sinusoidal signal, so that the base signal has the parameter values from the parameter module 612 or filter 614.

Optionally, at step 514, the controller 602 can sense a measure of an environmental state and further adjust the base signal based on the sensed measure. For example, the controller 602 can include an external sensor 606 configured to obtain a measure of at least one environmental state. In this case, the controller 602 can be configured to dynamically generate each of the control signals by further adjusting the parameter(s) of the base signal in accordance with the measure of the one or more environmental states. The use of an external sensor in this way can further enhance the realism of the resulting lighting effect. For example, the sensor 606 can be configured to sense airflow, temperature and/or motion. Here, the sensor 606 can include a microphone to sense the airflow, a thermometer to sense the temperature, and/or an accelerometer to sense motion. Thus, to provide a more realistic simulation of a candle flame, the light output by the system can be adapted to the sensed measure of the environmental state. For example, if the airflow/motion increases or is relatively high, then the period/amplitude of the control signal can be decreased; in turn, if the airflow/motion decreases or is relatively low, then the period/amplitude of the control signal can be increased. Similarly, if the temperature increases or is relatively high, then the period/amplitude of the control signal can be increased, and if the temperature decreases or is relatively low, then the period/amplitude of the control signal can be decreased.

The system can modulate the control signal(s) in accordance with the sensed environmental state(s) in a variety of ways. For example, optionally, at step 516, the controller 602 can directly modulate each of the respective control signals for the disjointed sets of light-emitting elements by applying the sensed measure(s) directly to the control signals generated by the function generator 616. For example, the function generator 616 can apply the sensed measure as a multiplication factor to the signal parameters modulated by the system. More preferably, at optional step 518, the controller 602 can adjust the filter parameters of the smoothing filter 614. For example, the filter parameter module 620 can properly normalize the sensor values output by the sensor 606 to determine associated filter parameters. Here, the filter parameter module 620 can properly normalize and apply the sensor output as a filter coefficient with which the filter 614 smooths the sequence of parameter values received from the parameter module 612. The function generator 616 can then generate the control signal by modulating the base signal so that the signal has the parameter values provided by the filter 614, as noted above.

More preferably than either step 516 and 518, at optional step 520, the controller 602 can adjust one or more probability values of the transition probability matrix A in accordance with the sensed measure(s). For example, for any given current state of the random variable(s)/signal parameter(s) for which the sensor obtains one or more environmental measures, the controller 602 can increase the probability that the parameter remains in the current state for the succeeding time interval if the sensor value/measure is low or beneath a threshold for the value/measure. For example, if an airflow/temperature/movement measure is low or falls below a first threshold, then the controller 602 can increase the probability that the parameter remains in the current state. In addition, the controller 602 can increase the probability that the parameter transitions to a different state for the succeeding time interval if the sensor value/measure is high or greater than a second threshold, which can be different from the first threshold, for the value/measure. For example, if an airflow/temperature/movement measure is high or exceeds the threshold, then the controller 602 can increase the probability that the parameter transitions to another state. The adjustment to the probability matrix can be made such that the adjustment is temporary and the probability matrix returns to its original configuration after a brief time interval. Alternatively or additionally, a probability matrix module 618 can provide the adjusted transition probability matrix to the Markov chain module 610 at each time interval. Thus, using the adjusted probability matrix, the Markov chain 610 can provide the sequence of states, as discussed above. Thereafter, continuing at step 502, the function generator 616 can generate the control signal by modulating the base, periodic signal so that the base signal has the parameter values received from the parameter module 612 or filter 614 that were adjusted in accordance with the sensed environmental measure(s).

As indicated above, the controller 602 can perform the step 502 to generate a respective control signal for each of the disjointed sets of light-emitting elements in the system. For example, if the controller 602 performs the method 500 for the arrangement 150, the controller 602 performs step 502 and its component steps as three independent, simultaneous threads to generate a first control signal for the set 160, a second control signal for the set 170 and a third control signal for the set 180, where each of the control signals is completely independent of each of the other control signals. The controller 602 can also perform step 502 and its component steps for the arrangement 100, where the controller 602 generates a first control signal for the set 120, a second control signal for the set 130 and a third control signal for the set 140 independently. Of course, the method 500 can be performed for any number of disjointed sets to generate corresponding control signals. Thus, if the parameter modulated is a period, then the period for a respective control signal for any of the disjointed sets is an independent variable with respect to the period of the respective control signal for any other set of the disjointed sets. For example, the period for the set 120 is an independent variable with respect to the period for the set 130, as changing the value of the period for the set 120 does not change the value of the period for the set 130, and vice versa.

At step 522, for each disjointed set of light-emitting elements, the system can generate a light-emission signal for each light-emitting element in the set. Here, the light emission signals can be generated by the controller 602 and/or the light-emitting elements $608_1$-$608_n$. As noted above, the light-emitting elements $608_1$-$608_n$ can be the light-emitting elements in one disjointed set of light-emitting elements. To implement step 522, the system can, at block 524, generate multiple phases of the control signal for a given set of the disjointed sets of light-emitting elements for the arrangement. For example, for the first control signal for the set 120 in the arrangement 100, the function generator 616 can form the light-emission signals such that each of the light-emission signals is a different phase-shifted form of the first control signal. For example, the function generator 616 can form a first light-emission signal by shifting the control signal by a phase $\phi_1$ for the light-emitting element $608_1$, a second light-emission signal by shifting the control signal by a phase $\phi_2$ for the light-emitting element $608_2$, . . . and an $n^{th}$ light-emission signal by shifting the control signal by a phase $\phi_n$ for the light-emitting element $608_n$, where each of the phases are different from any of the other phases. The controller 602 can form the light-emission signals for each of the other disjointed sets in the same way using the respective control signal for the corresponding set. Alternatively, each of the light-emitting elements $608_1$-$608_n$ can receive the control signal for its set and can apply its own respective phase to the control signal and thereby generate its own light-emission signal. For example, the light-emitting element $608_1$ can form the first light-emission signal by phase-shifting the control signal by a phase $\phi_1$, the light-emitting element $608_2$ can form the second light-emission signal by phase-shifting the control signal by a phase $\phi_2$, etc. Similarly, the light-emitting elements of each of the other disjointed sets can form their own respective light-emission signals in the same way using the respective control signal for its set. Here, if the controlled parameter(s) is, for example, the period of the signal, then the period for a given light-emission signal for a given disjointed set is a dependent variable with respect to the period of any other light-emission signal for that disjointed set, as changing the value of the period for one light-emission signal of the set would change the value of the period for another light-emission signal of the set. This is because, in this embodiment, the light-emission signals are phase-shifted forms of the control signal for the set. It should be noted that any one of the phases $\phi_1$-$\phi_n$ can be zero degrees in embodiments described herein.

At step 526, the light-emitting elements can control/adjust the intensities of their emitted light in accordance with their light-emission signals, which are based on the respective control signal for their corresponding set. Thus, the light-emitting elements can control/adjust the intensities of their emitted light also in accordance with the respective control signal for their corresponding set. For example, the intensity of the light emitted by any given light-emitting element can be proportional to the amplitude of the respective light-emission signal of that element. Here, the light-emitting element $608_1$ can adjust the intensity of its emitted light in accordance with the first light-emission signal, which is the phase-shifted control signal for the corresponding disjointed set, shifted by a phase $\phi_1$, the light-emitting element $608_2$ can adjust the intensity of its emitted light in accordance with the second light-emission signal, which is the phase-shifted control signal for the corresponding disjointed set, shifted by a phase $\phi_2$, etc. Similarly, the light-emitting elements of each of the other disjointed sets can adjust their own respective light-emission intensities in the same way using their respective light-emission signal. Thus, the corresponding intensity of each of the light-emitting elements of a given set can be adjusted with a phase of its respective control signal that is different from a phase of the respective control signal with which the corresponding intensity of at least one other light-emitting element of the given set is adjusted. Preferably, as noted above, all of the phases applied to the light-emitting elements of a given set are different.

In accordance with one exemplary embodiment, the light-emission signals for any of the one or more disjointed sets in the arrangement can be configured such that a total intensity of light emitted by the set is essentially constant. For example, the phase-shifts applied to a control signal for a given set of light-emitting elements can be configured to maintain the total intensity of light emitted by the set. For example, for a sinusoidal control signal with two light-emitting elements in a given set, the phase can be chosen to be zero degrees for the first light-emission signal and pi degrees for the second light-emission signal. In general, for a sinusoidal control signal with n light-emitting elements in the set, the phases can be chosen to be integer multiples of $2\pi/n$. As noted above, maintaining the total flux/intensity in this way is important if, for example, the lighting system is used as a primary source of lighting, such as in a chandelier. Maintaining the total flux is desirable because a varying total flux in a primary light source is often perceived as being bothersome, as it is difficult for a user to focus on objects or read under these circumstances.

Employing disjointed sets of light-emitting elements in the various geometric arrangements described above enhance a lighting system's ability to accurately mimic a candle flame. The interspersion of the light-emitting elements of the disjointed sets and the use of the independent control signals with the disjointed sets described above randomize the lighting effect in a way that realistically simulates a flame, while at the same time enables the system to maintain a total flux. The flickering simulation can be further enhanced through the use of the various light-guides and colored light-emitting elements and arrangements, as described above.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. For example, instead of employing disjointed sets, the method 500 and the system 600 can be implemented to form a randomized control signal for each light-emitting element in the system. For example, step 502 can be performed independently for each light-emitting element so that each light-emitting element is controlled with a different, independent control signal. In this case, step 522 need not be performed, as the light-emitting elements can control their respective intensities based on their individual control signals. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A light-emitting system for simulating a flame comprising:
   a plurality of disjointed sets of light-emitting elements,
   a controller configured to dynamically generate a plurality of control signals,
   wherein the light-emitting elements of a given set of the disjointed sets of light-emitting elements are configured to adjust corresponding intensities of emitted light in accordance with a respective control signal of the plurality of control signals, and
   wherein at least one parameter of the respective control signal is an independent variable with respect to the at least one parameter of another control signal with which the light-emitting elements of another set of the disjointed sets adjust respective emitted light intensities,
   wherein the light-emitting elements within the given set adjust the corresponding intensities of the emitted light in accordance with a plurality of light-emission signals that are based on the respective control signal such that the at least one parameter of each light-emission signal of the plurality of light-emission signals is a dependent variable with respect to the at least one parameter of each other light-emission signal of the plurality of light-emission signals.

2. The light-emitting system of claim 1, wherein the corresponding intensity of each of said light-emitting elements of said given set is adjusted with a phase of said respective control signal that is different from a phase of the respective control signal with which the corresponding intensity of at least one other light-emitting element of said given set is adjusted, and wherein each of said phases is configured such that a total intensity of light emitted by the given set is essentially constant.

3. The light-emitting system of claim 1, wherein the controller configured to dynamically generate each of said control signals by adjusting the at least one parameter of a base signal, wherein a randomized process is employed to determine a sequence of values of said at least one parameter.

4. The light-emitting system of claim 3, wherein the controller further comprises a sensor configured to obtain a measure of at least one environmental state, wherein the controller is configured to dynamically generate each of said control signals by further adjusting the at least one parameter of the base signal in accordance with the measure of the at least one environmental state.

5. The light-emitting system of claim 1, wherein the light-emitting elements of the disjointed sets are spatially distributed such that at least one light-emitting element from each of the disjointed sets other than the given set is disposed between at least two light-emitting elements of said given set.

6. The light-emitting system of claim 1, further comprising:
 a light-guide structure including a plurality of light-guides, wherein each of said light-guides out-couples light from a different one of said disjointed sets of light-emitting elements.

7. The light-emitting system of claim 6, wherein said plurality of light-guides are nested in said light-guide structure.

8. The light-emitting system of claim 7, wherein each set of said disjointed sets emits light with a color that is different from a color of light emitted by any other set of the disjointed sets.

9. A method for simulating a flame with a light-emitting system comprising:
 generating a plurality of control signals respectively to a plurality of disjointed sets of light-emitting elements; and
 adjusting, in each set of the plurality of disjointed sets, intensities of the light-emitting elements of the set in accordance with a respective control signal of the plurality of control signals,
 wherein at least one parameter of the respective control signal for any of said sets is an independent variable with respect to the at least one parameter of the respective control signal for any other set of the disjointed sets,
 wherein the adjusting further comprises applying, in each corresponding set of the plurality of disjointed sets, a plurality of phases of the respective control signal to the light-emitting elements of the corresponding set such that the phase applied to any light-emitting element of the set is different from the phase applied to any other light-emitting element of the corresponding set.

10. The method of claim 9, further comprising:
 generating, for each of the light-emitting elements in each corresponding set of the plurality of disjointed sets, a respective light-emission signal that is based on the respective control signal for the corresponding set such that the at least one parameter of each light-emission signal for the corresponding set is a dependent variable with respect to the at least one parameter of each other light-emission signal for the corresponding set,
 wherein the adjusting further comprises adjusting the intensity of each respective light-emitting element of the corresponding set in accordance with the light-emission signal for the respective light-emitting element.

11. The method of claim 9, wherein the applying is performed such that a total intensity of light emitted by the corresponding set is essentially constant.

12. The method of claim 9, wherein the at least one parameter is at least one of a period, an amplitude, and a direct current offset.

13. The method of claim 9, wherein the generating further comprises, for each control signal of the plurality of control signals, modulating the at least one parameter of a base signal and wherein the generating further comprises, for each control signal of the plurality of control signals, determining a sequence of values of said at least one parameter by determining a sequence of states in accordance with a randomized process.

14. The method of claim 13, wherein the generating further comprises sensing a measure of at least one environmental state and, for each control signal of the plurality of control signals, further adjusting the at least one parameter of the base signal in accordance with the measure of the at least one environmental state, wherein the sensing comprises sensing at least one of airflow, temperature and motion.

15. The method of claim 14, wherein the further adjusting comprises adjusting filter parameters of a low-pass filter with which said sequence of values is filtered in accordance with the measure.

16. The method of claim 14, wherein the randomized process is a Markov process and wherein the further adjusting comprises adjusting at least one probability of a state transition probability matrix employed in the Markov process.

17. A light-emitting system for simulating a flame comprising:
 at least one light-emitting element, wherein the at least one light-emitting element is configured to adjust a corresponding intensity of emitted light in accordance with a control signal; and
 a controller configured to generate said control signal by adjusting at least one parameter of a base signal and to perform said adjusting by applying a transition probability model in which a first probability that the at least one light-emitting element remains in a state of a first set of states is different from a second probability that the at least one light-emitting element remains in a state of a second set of states, wherein a first value of said at least one parameter of said first set of states is different from a second value of said at least one parameter of said second set of states.

18. The system of claim 17, wherein said first probability is greater than said second probability, wherein said at least one parameter includes a period of said base signal, and wherein the second value is less than the first value.

19. The system of claim 18, wherein said controller is configured to perform said adjusting in accordance with a Markov process and wherein said transition probability model is a transition probability matrix.

* * * * *